(12) United States Patent  (10) Patent No.: US 7,580,182 B2
Kump et al.  (45) Date of Patent: Aug. 25, 2009

(54) FREQUENCY SYNTHESIS FOR ACOUSTO-OPTIC DEVICES

(75) Inventors: John D. Kump, Hillsborough, CA (US); Dieter Jundt, Palo Alto, CA (US)

(73) Assignee: Crystal Technology, Inc., Palo Alto, CA (US)

( * ) Notice: Subject to any disclaimer, the term of this patent is extended or adjusted under 35 U.S.C. 154(b) by 54 days.

(21) Appl. No.: 12/022,961

(22) Filed: Jan. 30, 2008

(65) Prior Publication Data

US 2008/0180782 A1    Jul. 31, 2008

Related U.S. Application Data

(60) Provisional application No. 60/898,455, filed on Jan. 30, 2007.

(51) Int. Cl.
*G02F 1/33* (2006.01)
*G02F 1/11* (2006.01)
(52) U.S. Cl. .................... 359/307; 359/285; 359/305
(58) Field of Classification Search ............ 359/239, 359/285, 286, 287, 305, 306, 307, 309

See application file for complete search history.

(56) References Cited

U.S. PATENT DOCUMENTS

| 3,665,204 A * | 5/1972 | Nelson ................. 359/285 |
| 6,232,922 B1 * | 5/2001 | McIntosh ............... 342/453 |
| 6,421,166 B1 * | 7/2002 | Velsko et al. ............ 359/330 |
| 7,136,559 B2 * | 11/2006 | Yusoff et al. ............ 385/125 |

\* cited by examiner

*Primary Examiner*—David N Spector
(74) *Attorney, Agent, or Firm*—Goodwin Procter LLP; Paul Davis

(57) ABSTRACT

A system for controlling an acousto-optic device includes an acousto-optic device having an acoustic transducer and configured to store a number of design specific parameters for a parametric tuning algorithm. the system includes a frequency synthesizer coupled to the acousto-optic device and configured to provide a radio frequency tuning signal to the acousto-optic device via the acoustic transducer. A programmable controller is coupled to the acousto-optic device and the frequency synthesizer and wherein is configured to read the design specific parameters and to receive a second number of parameters comprising one or more of environmental parameters, setup specific parameters and user specified performance parameters. the programmable controller is also configured to apply the design specific parameters and the other parameters to the design specific parametric tuning algorithm to select a radio frequency tuning signal that optimizes a user specified performance parameter.

9 Claims, 8 Drawing Sheets

FREQUENCY SYNTHESIS FOR ACOUSTO-OPTIC DEVICES

This application claims the benefit of U.S. Provisional Application No. 60/898,455, filed Jan. 30, 2007, which is incorporated herein by reference in its entirety.

TECHNICAL FIELD

The present invention relates generally to the control of acousto-optic (AO) devices and, in particular, to controlling a radio frequency drive signal to compensate for changes in environmental and AO device parameters.

BACKGROUND

Acousto-optic (AO) devices utilize acoustic waves to change the transmission characteristics of an acousto-optic medium (e.g., optical crystals such as fused silica, arsenic trisulfide, tellurium dioxide and other materials that are known in the art). The acoustic waves modulate the refractive index of the acousto-optic medium, with a spatial periodicity equal to the wavelength of the acoustic waves in the acousto-optic medium, and effectively create a diffraction grating that can be tuned by changing the frequency and/or amplitude of the acoustic waves. The acoustic waves are generated with acoustic transducers (i.e., piezoelectric devices) that are driven by radio frequency (RF) tuning signals.

Different types of acousto-optic devices are possible based on different choices of acousto-optic materials, wave geometry and desired performance parameters. AO modulators are used to adjust the power diffracted from a laser beam at a specified diffraction angle and are typically driven with a variable amplitude, fixed frequency RF signal. AO deflectors are used to adjust the angle of diffraction of an incident laser beam and are typically driven with a fixed amplitude, variable frequency RF signal. AO tunable filters (AOTFs) are used to select a specific wavelength of a broadband or multi-wavelength light source and are typically driven with a variable frequency RF signal. Each of these applications requires an adjustable RF signal source. Direct digital synthesis (DDS) allows RF sources to be adjusted programmatically through a digital interface.

Generally, the RF signal frequency needed to achieve a desired diffraction result is a function of many variables, including design variables (e.g., material selection, alignment of acoustic and optical axes, acoustic transducer efficiency, etc.) and environmental variables such as temperature. Closed-loop feedback systems can be used to adjust the RF source to maintain a desired performance parameter (e.g., diffraction angle or diffraction wavelength), but work in only a limited range of applications where the performance of the diffraction can be monitored and require an optical detector and feedback circuitry that adds cost and complexity to an AO system.

Acousto-optic tunable filters generally vary the applied RF signal frequency over a broad range, for example from 80 MHz to 150 MHz, to achieve wide wavelength tuning of the diffracted wavelength. For many applications (e.g., in fluorescence detection), precise wavelength control is needed to optimize system performance. The effect of varying temperature, variations in device manufacturing or alignment, and other factors will change the required frequency from one system to the next even for the same nominal performance parameters. Optimizing performance under these variations requires each device either to be operated under a feedback control system or to be calibrated after installation in the final system.

SUMMARY

In one embodiment of the present invention, a system for controlling an acousto-optic device comprises an acousto-optic device including an acoustic transducer and a readable design specific parametric tuning algorithm. A frequency synthesizer coupled to the acousto-optic device is configured to provide a radio frequency (RF) tuning signal to the acousto-optic device via the acoustic transducer. A programmable controller is coupled to the acousto-optic device and the frequency synthesizer and configured to read the design specific parametric tuning algorithm and to receive parameters comprising one or more of environmental parameters, setup specific parameters and user specified performance parameters. The programmable controller is further configured to apply the parameters to the design specific parametric tuning algorithm to select a radio frequency tuning signal that optimizes a user specified performance parameter.

In one embodiment of the present invention, a method for controlling an acousto-optic device includes reading a design specific parametric tuning algorithm associated with the acousto-optic device, receiving parameters comprising one or more of environmental parameters, setup specific parameters and user specified performance parameters, and applying the parameters to the design specific parametric tuning algorithm to select a radio frequency tuning signal that optimizes a user specified performance parameter.

BRIEF DESCRIPTION OF THE DRAWINGS

The present invention is illustrated by way of example and not limitation in the figures of the accompanying drawings, in which.

DETAILED DESCRIPTION

Figure 1:
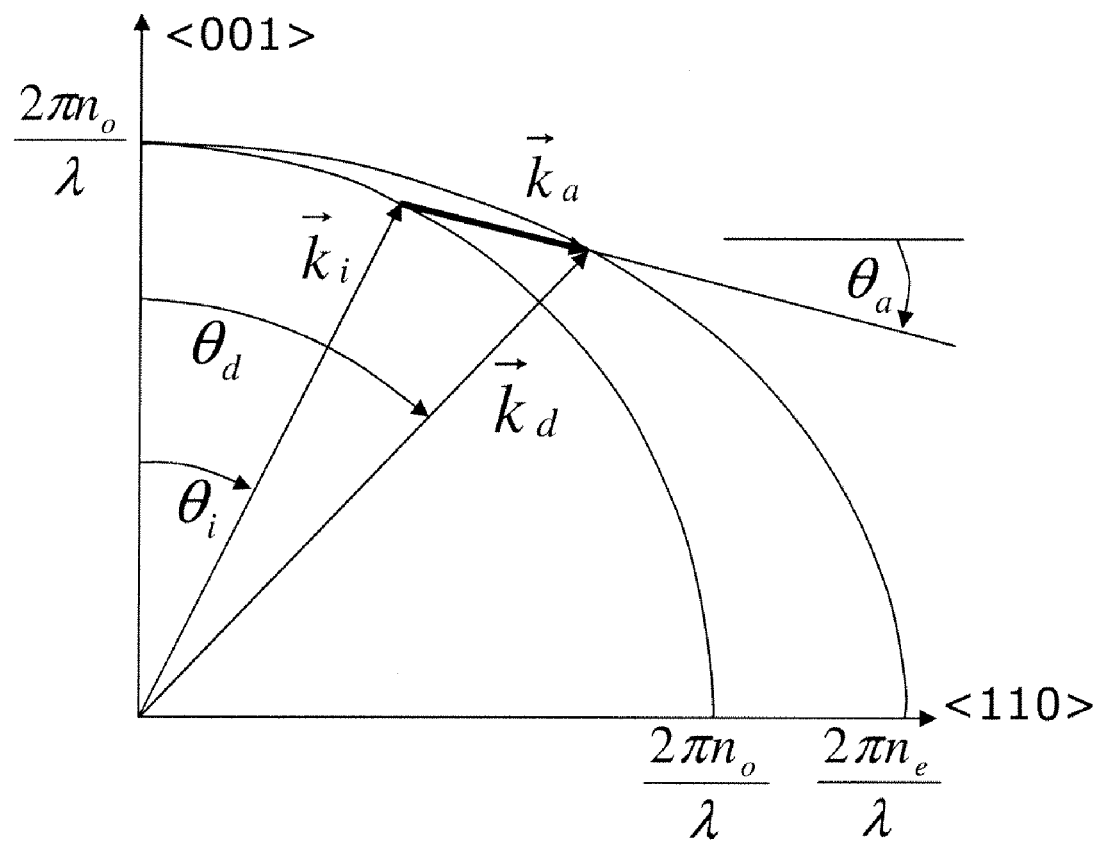
FIG. 1 illustrates a schematic representation of the wave vector interaction in a generic acousto-optic interaction.

Methods and systems for controlling an acousto-optic device are described. In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well-known materials or methods have not been described in detail in order to avoid unnecessarily obscuring the present invention.

An acousto-optic interaction in an acousto-optic device involves three wave fields: the incoming optical wave, the acoustic wave, and the diffracted optical output wave. The incoming optical wave is typically characterized as a plane wave with wave vector $\vec{k}_i$ parallel to the direction of propagation of the incoming optical wave (i.e., perpendicular to the electric field and magnetic field vectors of the plane wave). This characterization can be generalized to more complex spatial or spectral optical fields by Fourier integration. The wave vector $\vec{k}_i$ depends on the propagation direction of the optical wave in the AO medium, the wavelength, and the temperature of the AO medium. For a given polarization of the incoming optical wave, either ordinary polarization (electric field vector parallel with the optical axis of the AO medium) or extraordinary polarization (electric field vector perpendicular to the optical axis of the AO medium), or a combination of both, and a fixed angle of incidence with the respect to the crystalline axes of the AO medium, the value of the wave vector $\vec{k}_i$ is a function of its wavelength and the temperature of the AO medium as shown in equation (1), below:

$$\vec{k}_i = \frac{2\pi}{\lambda_i} n(\lambda_i, T) \vec{e}_i \quad (1)$$

In equation (1), the index i stands for the incoming wave, $\vec{e}$ is the unit length optical wave vector in the direction of propagation, $\lambda_i$ is the wavelength and n is the index of refraction of the AO medium at wavelength $\lambda_i$ and temperature T. For the purposes of the following discussion, it is assumed that the direction of $\vec{e}_i$ is invariant for all wavelengths and temperatures.

The wave vector for the acoustic wave is given by equation (2):

$$\vec{k}_a = \frac{2\pi \cdot f}{v} \vec{e}_a. \quad (2)$$

In equation (2), $\vec{e}_a$ is the unit length acoustic wave vector in the direction of propagation. The acoustic direction of propagation is perpendicular to the plane of the AO medium to which the acoustic transducer is attached. The frequency at which the transducer is driven is f, and v is the acoustic velocity, which depends on the effective elastic stiffness $C_{eff}$ and density $\rho$ of the AO medium. Therefore, the magnitude of the acoustic wave vector depends on the acoustic frequency and the elastic stiffness, which in turn depends on the acoustic mode type, longitudinal or shear for example, and the temperature. As above, we assume for the discussion herein that the device geometry fixes the propagation direction.

For the case of a birefringent acoustooptic interaction, FIG. 1 illustrates a wave vector diagram, for example, in a crystal of tellurium dioxide (TeO$_2$). In FIG. 1, the directions $\vec{e}_i$ and $\vec{e}_a$ are defined by their respective angles $\theta_i$ and $\theta_a$ relative to the crystallographic axes of the material.

The incoming wave vector has ordinary polarization (s-plane polarization where the electric field is perpendicular to the plane of incidence), where the index of refraction depends only on wavelength and temperature, and not direction. The direction is fixed by the relative angle $\theta_i$ between the incoming light beam and the optical crystal face (<001> axis).

The direction of the acoustic wave vector is similarly fixed, but the length can be changed by adjusting the frequency f, and to a smaller degree, the temperature.

The diffracted wave with wave vector $\vec{k}_d$ is extraordinarily polarized for the example shown in FIG. 1. Diffraction efficiency is defined as the ratio of the diffracted light intensity, of a given order, to the incident light intensity. With the above notation, the Bragg condition, where maximal diffraction efficiency is obtained, can be written as:

$$\vec{k}_d = \vec{k}_i \pm \vec{k}_a \quad (3)$$

Figure 2:
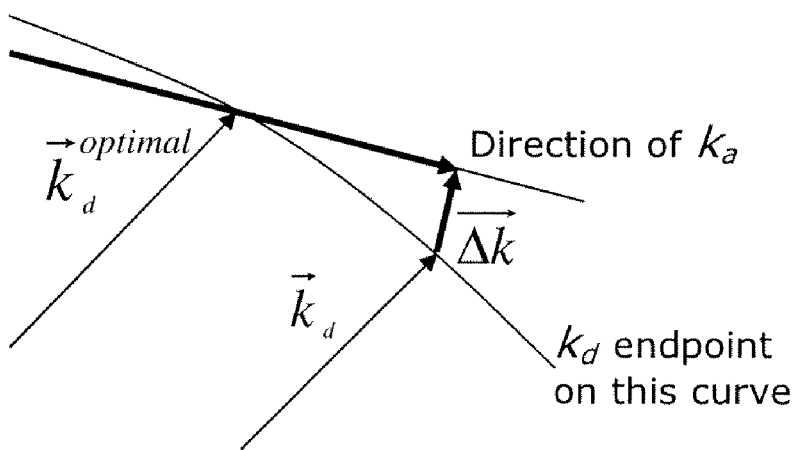
FIG. 2 illustrates a detail of the wave vector interaction in an acousto-optic interaction where a phase-mismatch is present.

Satisfying the Bragg condition means that the endpoints of $\vec{k}_a$ and of $\vec{k}_d$ are the same. The more general case where the acoustic frequency is somewhat detuned (e.g., too high) from the optimum frequency is illustrated in FIG. 2. In FIG. 2, the endpoint of the wave vector $\vec{k}_d$ is restricted to lie on the curve defined by the index of refraction, at the given temperature and wavelength, and bounded by $2\pi n_o/\lambda$ for ordinary polarization and $2\pi n_e/\lambda$ for extraordinary polarization. As noted above, the frequency of the acoustic wave defines the length of the vector $\vec{k}_a$. The direction of $\vec{k}_d$ will adjust to minimize the magnitude of the mismatch $\Delta\vec{k}$. The deflection angle $\theta_d$ will increase slightly and the efficiency of the interaction will be lower than optimal because equation (3), the Bragg condition, is violated. As a general guideline, reasonably high diffraction efficiency, greater than 80%, can be expected if the scalar product of the mismatch $\Delta\vec{k}$ and the dimension of the interaction volume in the AO medium in that direction is smaller than $\pi/2$.

Figure 3:
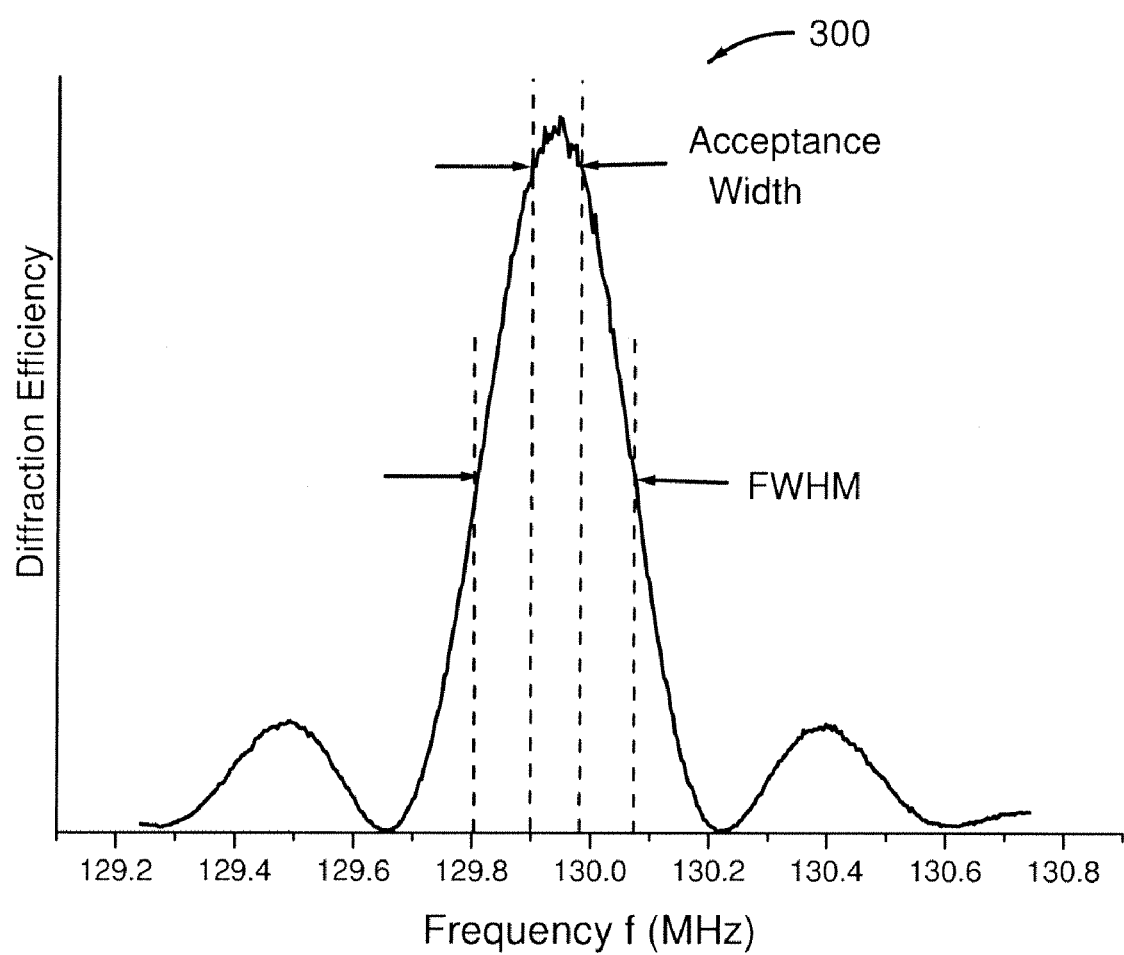
FIG. 3 illustrates acousto-optic diffraction efficiency for a typical interaction as the frequency is varied in the neighborhood of optimal operating condition.

For the case of an acousto-optic tunable filter (AOTF), it is desirable to know the required RF frequency as a function of optical wavelength and device temperature. FIG. 3 illustrates the diffraction efficiency 300 of an exemplary AOTF for an optical wavelength of 488 nm as the RF frequency is tuned across the Bragg condition. A frequency shift of several 10s of kHz around the optimal value does not affect the diffraction efficiency significantly. The half power bandwidth for this exemplary device and wavelength (also known as the full width at half maximum value, or FWHM) is approximately 264 kHz.

Figure 4:
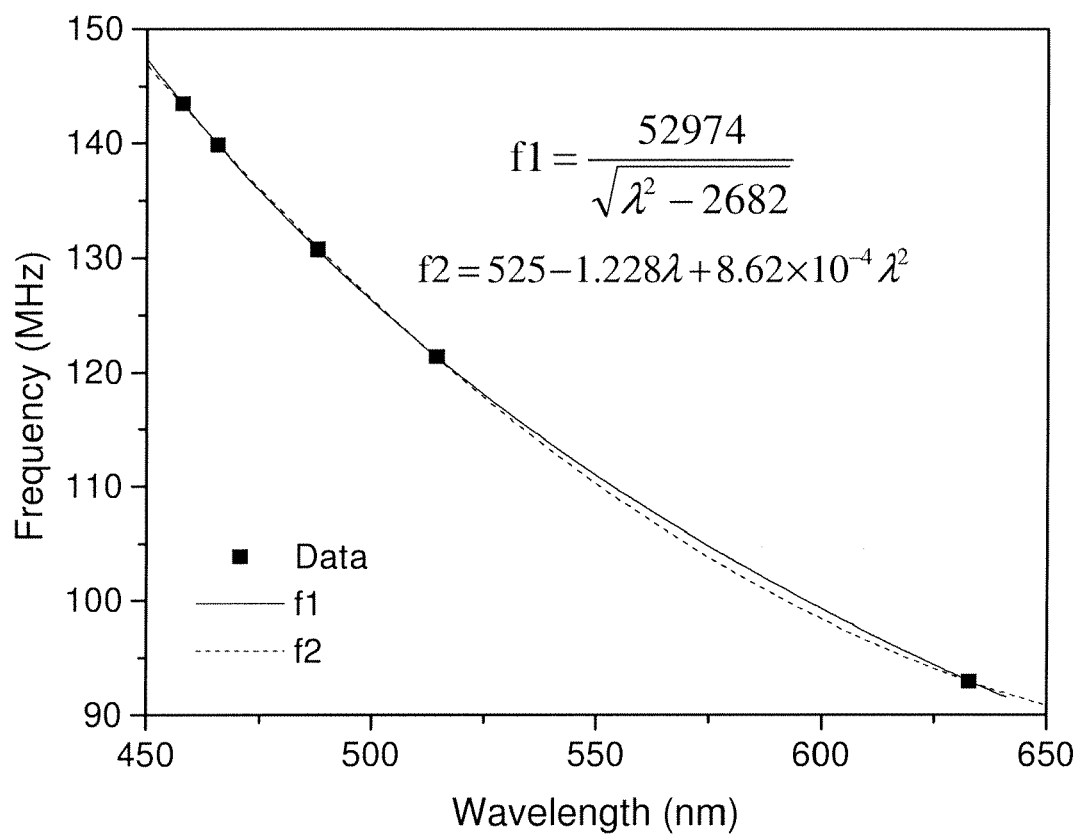
FIG. 4 illustrates the frequency required for a representative acousto-optic tunable filter as a function of wavelength to be deflected.

By repeating this measurement for other wavelengths and determining the required frequency for peak diffraction efficiency, the optimal frequency as a function of wavelength f($\lambda$) can be plotted as illustrated by curve 400 in FIG. 4. The curve is specific to an AOTF design and will shift slightly with alignment or temperature variations. In principle, the function can be calculated from the stiffness, refractive index tensors and the device geometry. However, these parameters are not generally known to the accuracy needed. Furthermore, a slight deviation in crystal cut or alignment can shift the frequencies by more than the acceptance width shown in FIG. 3. The acceptance width is defined as the frequency range about the optimal frequency where satisfactory diffraction efficiency is achieved. Nonetheless, the required frequency can be predicted approximately for a given device geometry, and this may serve as a starting point in an experimental setting to find the optimal diffraction condition. The measured curve (at room temperature) can be approximated by a polynomial or some other fit function. FIG. 4 illustrates measured data and two possible fit functions, f1 and f2 for the measured data. Curve fitting algorithms are known in the art and, accordingly, are not described in detail here.

Figure 5:
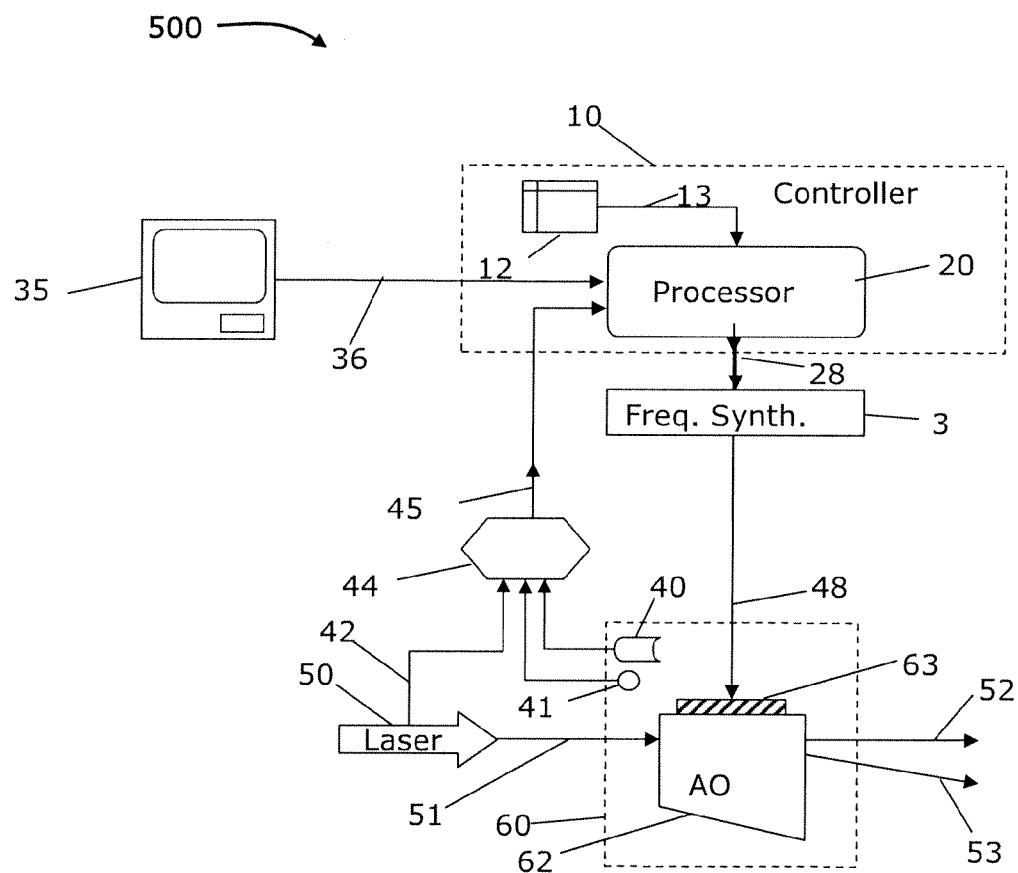
FIG. 5 illustrates an acousto-optic frequency synthesizer according to one embodiment of the present invention integrated in a system.

FIG. 5 illustrates an acousto-optic device control system 500 according to one embodiment of the present invention. System 500 includes an acousto-optic device 60, which includes an AO cell 62 and an acoustic transducer 63. In certain embodiments, acousto-optic device 60 may include more than one acoustic transducer as described in U.S. patent application Ser. No. 11/652,384, filed Jan. 10, 2007, which is incorporated herein by reference.

Acoustic waves in the acousto-optic cell 62 are generated by an RF signal supplied by frequency synthesizer 3 to acoustic transducer 63 via RF cable 48. The AO device 60 may be a modulator, a tunable filter selecting a wavelength to deflect, or a deflector changing the angle of a deflected laser beam 53. The optical input to AO device 60 is provided by a laser 50. Depending on the specific application (i.e., modulation, deflection or filtering), laser 50 may be a single line laser, a multi-wavelength laser, a system that combines laser beams of various wavelengths, or even a broadband source (e.g., a fiber laser). The incoming laser beam 51 interacts with the acoustic wave inside cell 62 and exits as deflected beam 53 and/or undeflected beam 52.

Frequency synthesizer 3 may be a direct digital synthesizer (DDS) controlled by a local controller 10 via a control bus 28. Controller 10 may include a processor 20 and a memory 12 coupled to processor 20 via a bus 13. In one embodiment, processor 20 and memory 12 may be incorporated within frequency synthesizer 3.

A computer or control console 35 may be connected to the controller 10 via a digital communication channel 36. This channel may be unidirectional with computer 35 configured to provide programmed or user provided inputs for the values of desired performance parameters to the controller 10. alternatively, channel 36 may be bidirectional where the controller 10 also provides status information on its own operation or the acousto-optic system as a whole.

The performance parameter transmitted may be the desired wavelength to be deflected for the case of an acousto-optic tunable filter, the deflection angle for the case of an acousto-optic deflector, or a diffraction efficiency for the case of an acousto-optic modulator. A program running on the computer may derive the values of these parameters either through a user interaction (e.g., adjusting a control icon such as a slide switch or entering a value) or through a program residing in the computer that control these parameters based on other requirements. Such programs are known in the art and are utilized, for example, to control semiconductor inspection equipment, laser light engines with adjustable wavelength output and confocal scanning microscopes.

The particular RF frequency (and RF power) needed to achieve the desired performance (e.g., a particular diffracted wavelength or deflection angle and diffraction efficiency) depends on many factors such as the AO cell material, crystal orientation, AO device temperature and the geometry of the beam propagation through the cell.

Embodiments of the invention include a method to calculate the RF frequency required to achieve a desired diffraction based on the performance parameter input, a set of design specific parameters characteristic of the design of the AO device (e.g., acousto-optic device temperature input, RF signal frequency output, RF signal power output, optical input power and optical alignment input.), environmental input parameters (e.g., temperature and optical input power) and setup specific parameters (e.g., optical alignment).

Information from a temperature sensor 41 located on or in the vicinity of the AO cell 62, either in digital or analog form, may be fed through an interface 44 to the processor 20. AO device 60 may include a memory device 40 (e.g., an EEPROM) that stores the design specific (or device specific) information for the AO device 60 that can be read and communicated to processor 20 via data interface 44. The design specific information may include a functional form for an RF tuning curve (such as tuning curve 400, for example) and parametric coefficients associated with one or more environmental or setup parameters.

Data interface 44 may include, for example, one or more digital switches, latches, multiplexers and analog-to-digital converters. Setup and other system specific parameter information (including both analog and digital information, for example) such as laser power, current, temperature etc. may be transmitted to processor 20 via connection 42, through interface 44 and data bus 45. In an alternate configuration, the data interface 44 and digital data connection 45 may be integrated into controller 10 or frequency synthesizer 3.

In one embodiment, memory 12 includes program data and instructions for a control algorithm that is executed by processor 20. In one embodiment, processor 20 executes the control algorithm based on parametric inputs received from computer 35 (performance parameters), laser 50 and temperature sensor 41 (setup specific parameters) and memory 40 (design specific parameters, parametric coefficients and the functional form of the tuning curve associated with the AO device 60). The control algorithm calculates an RF drive frequency based on a design specific tuning algorithm derived from the design specific tuning function (e.g., function 400), the parametric coefficients associated with the design of AO device 60, and all of the other parameters provided through data channels 36, 45 and 13. The output of the control algorithm, the calculated frequency (and RF power in some of the implementations), is fed to the frequency synthesizer 3, which generates the desired RF frequency at the desired RF output power.

Figure 6:
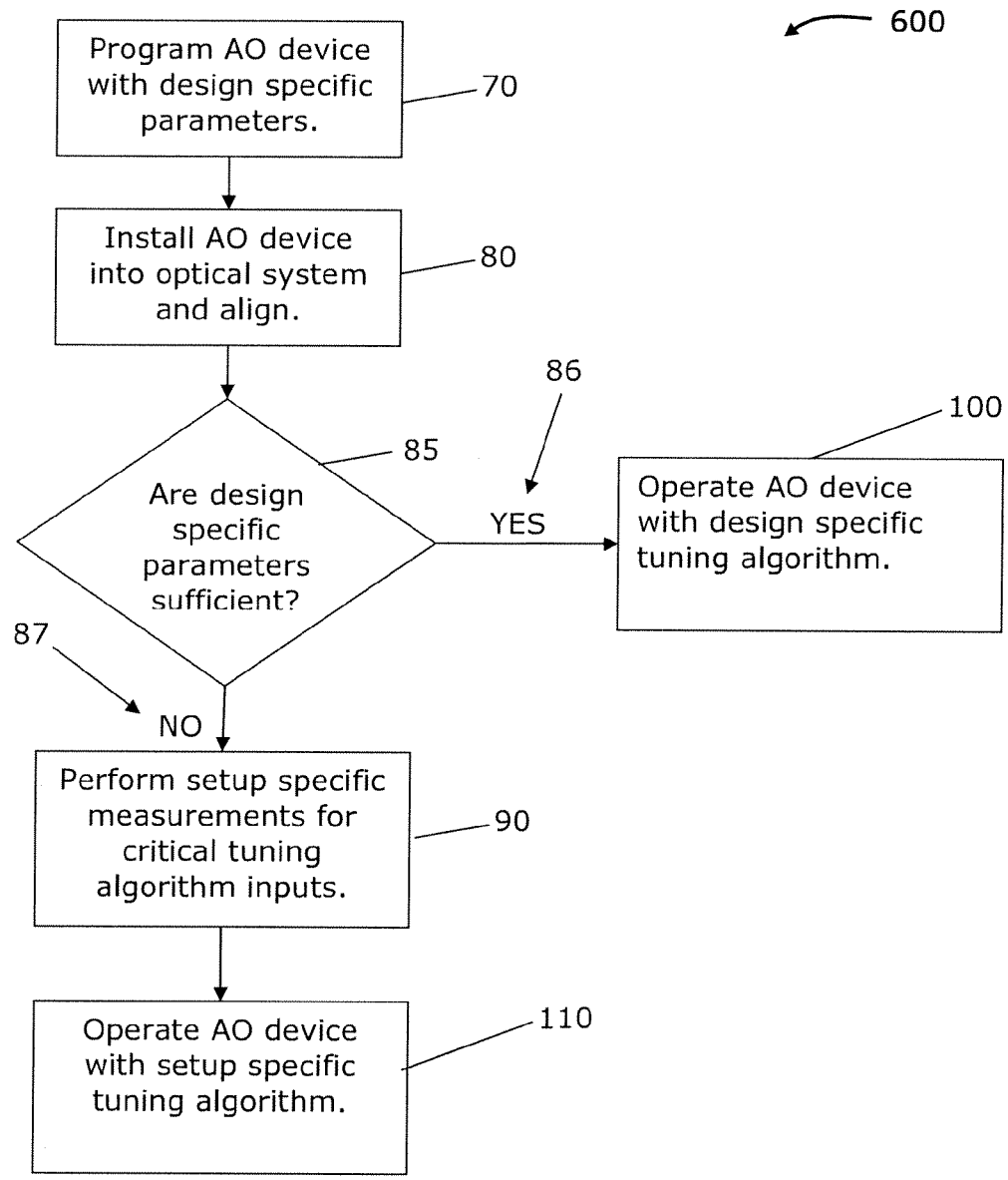
FIG. 6 is a flowchart illustrating a method in one embodiment of the present invention.
Figure 7:
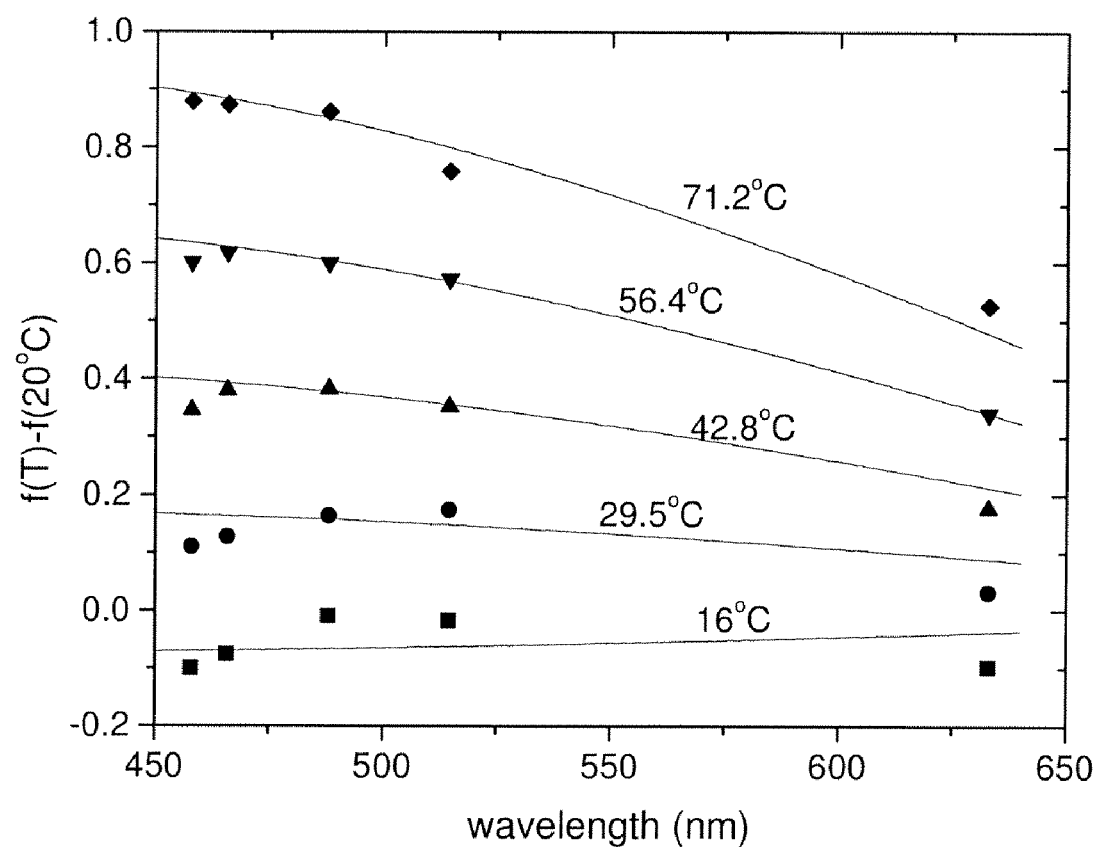
FIG. 7 illustrates the deviation of the calculated frequency shift, due to AOTF temperature change, from those experimentally measured.

FIG. 6 is a flowchart 600 illustrating a method for establishing parameter sets that may be used as inputs to the control algorithm of described above. Initially, the design specific parameters (functional form of the tuning curve including wavelength versus frequency, and parametric coefficients associated with environmental variables such as temperature) are determined by the AO device manufacturer for a particular design based on, for example, one or more prototypes or manufacturing samples. Once a particular AO device of this design is manufactured, the corresponding set of design specific parameters is programmed or written into a local memory (e.g., memory 40) in the AO device (operation 70). Alternatively, an AO device and an RF synthesizer may be manufactured together and the design specific parameters may be stored in a memory located inside the frequency synthesizer (not shown in FIG. 5).

Processor 20 is configured to read and executed data and instructions stored in memory 12 in order to execute the tuning control algorithm, including instructions on how to read and interpret the functional representation of the AO devices parametric tuning curve and the various parameter sets discussed above (i.e., design specific, setup specific and environmental). A simple compiler may be stored in memory 12 that when executed by processor 20, causes processor 20 to interpret the design specific parameters, including a notation that reflects the functional form of the parametric tuning curve to be used. One exemplary way of storing this information is illustrated in Table I.

TABLE I

| Data type | Value stored | note |
|---|---|---|
| String | f = A/sqrt(lambda * lambda – B * B) * (1 + (T – 20) * (C + lambda * D + lambda * lambda * E) | Information to be interpreted by compiler with parameters A, B, C, D, E, T, and lam |
| String | T = G + H * temp | Compiler instructions on setup specific information for temperature reading offset |
| String | A = 53293; B = 267.8; C = –4.20E–4; D = 2.13E–6; E = –2.06E–9; | Design specific parameter set |
| String | G = 0; H = 1; | Default values for setup specific parameter set |

For the example given in Table I, the performance parameter is the wavelength desired, denoted by "lambda". The measured temperature of the AO cell is denoted by "temp". An alternative way of storing the data is by assuming polynomial expansions, hard-coded into the program memory 12 of the controller 10, and storing only the coefficients (e.g., A, B, C, D, G and H) in a pre-defined format and sequence.

The programmed AO devices are sent to a customer where the AO device is built into a target system (analogous to the manufacturer's characterization system 500) where it is to be used, and all optical alignments and sensor connections are made (operation 80). The user may then decide whether the control algorithm using the pre-defined parameters provided by the manufacturer are accurate enough for predicting the RF frequency and RF amplitude needed to achieve the required performance result (operation 85). For some systems, the parameters supplied by the manufacturer may adequately predict the required frequency and amplitude and no further setup specific calibration is necessary (branch 86), in which case the AO device may be operated using only the design specific parameters, environmental parameters and the desired performance parameters (operation 100).

In other circumstances, the accuracy may not be sufficient (branch 87). The accuracy may be insufficient because the system requires higher precision than anticipated by the manufacturer, or it may be because some parameters such as alignment or temperature are substantially different from those of the prototypes or manufacturing samples that were used to derive the design specific parameters, and the functional form of the tuning curve provided by the manufacturer has a limited range of validity that is exceeded by the user's target system. For this case, a number of measurements may be performed on the actual system, similar to those done by the manufacturer for the design characterization (operation 90). These measurements may be performed automatically or under user control to generate a new set of parametric coefficients associated with the predetermined functional form of the RF tuning curve. In general, the number of measurements required to characterize the AO device in the user's system is equal to or greater than the number of parameters in the algorithm that are setup specific. Preferably, the number of measurements exceeds the minimum number so that the resulting coefficients have a greater statistical validity.

For the example above, there are two setup specific parameters that describe the difference in temperature measurement represented by parameters G and H. Two measurements at the same wavelength but at different temperature "temp" will determine these parameters uniquely. Additional measurements will improve the accuracy considering measurement uncertainties and noise. To derive the setup specific parameters, the model is used in a nonlinear fitting routine with the setup specific parameters being the fit parameters, and the experimental conditions (frequency measured) being the fit function output to be approximated by the fit model. Table II lists an example for such a device. Here, the temperature is that of a mounting platform for the AO device and is related to, but not necessary the same as that of the AOTF crystal.

TABLE II

| Wavelength (lam) | Temperature (temp) | Frequency (MHz) |
|---|---|---|
| 514.5 | 20 | 121.293 |
| 514.5 | 30 | 121.485 |
| 514.5 | 40 | 121.6632 |
| 514.5 | 50 | 121.8825 |
| 488 | 30 | 130.799 |
| 488 | 40 | 131.0174 |

Using these data points and assuming the functional form and parameter values A through E in table I and a nonlinear fit routine yields G=–6.48 and H=1.24. For this example, there is a significant difference between the temperatures measured at the base platform from that needed to optimize diffraction efficiency in the algorithm. This derivation of setup specific measurements can be automated and the established parameter set may then be stored in the nonvolatile memory of the AO device (e.g., memory 40), replacing the default values stored there, or in the controller to be used in conjunction with the setup.

The setup is now calibrated such that no further adjustments are necessary. Even after powering down and restarting the user's target system, all the information to accurately determine the output of the tuning algorithm (e.g. frequency and power) is available in the various memory locations or supplied by the computer as desirable performance parameters. In the exemplary system described here, the four strings stored in the memory in the AO device contain the instructions to the compiler for the tuning function used, and the values of both the design and setup specific parameters.

The processor 20 also reads the temperature "temp" and gets the input from the user interface (e.g., computer 35) that specifies the value of "lambda." The information is then complete for the control algorithm to determine the RF frequency and amplitude required to achieve the specified performance parameter (box 110).

While the preceding discussion is specific to an acousto-optic tunable filter (AOTF), the same methods of deriving a functional form for the tuning algorithm and the design specific parameters can be used for other AO devices, such as modulators and deflectors. Assuming that the device design (cell dimensions and target propagation angles with respect to crystallographic axes) is set, and that a tunable laser system is built using the spectrally broadened output of a laser as an input to the AOTF, the AOTF output then has a wavelength peak that is determined, among other factors, by the RF frequency. Deriving a design specific parameter set requires that variations of the AO device temperature and other parameters to be taken into account, including the frequency generated by the frequency synthesizer, and measurements of the peak wavelength diffracted by the AOTF.

Alternatively, fixed wavelength lasers can be used and the RF frequency may be scanned to determine the optimal frequency for each fixed wavelength input. A set of such measurements is shown in Table III.

TABLE III

| Temperature T (deg C.) | Wavelength λ (nm) | Frequency f (MHz) |
|---|---|---|
| 28.31875 | 465.8 | 139.9603 |
| 28.37125 | 457.9 | 143.5937 |
| 29.6594 | 632.8 | 92.98408 |
| 29.8656 | 514.5 | 121.485 |
| 29.8914 | 488 | 130.799 |
| 41.67345 | 465.8 | 140.2128 |
| 42.77705 | 488 | 131.0174 |
| 42.8078 | 514.5 | 121.6632 |
| 42.91095 | 457.9 | 143.8292 |
| 43.5297 | 632.8 | 93.12832 |
| 55.31175 | 465.8 | 140.4502 |
| 55.59535 | 488 | 131.2346 |
| 56.49765 | 457.9 | 144.084 |
| 56.575 | 514.5 | 121.8825 |
| 58.01875 | 632.8 | 93.29235 |

The data in Table III can be represented as a two-dimensional function $f(\lambda, T)$. The function is specific not only to the design of the AO device, but also to the particular setup (i.e., device and alignment parameters of the cell where the data was taken) in which the device is employed. The first step in using the data of Table III is to find a fit function that reproduces the measured frequencies within measurement uncertainties. From simulations of the data in Table II, it has been found that the function is given by equation (4) provides good agreement.

$$f(\lambda, T) = \frac{A}{\sqrt{\lambda^2 - B^2}}(1 + (T - T_0) \times (C + D\lambda + E\lambda^2)) \quad (4)$$

The parameters A, B, C, D and E are fit parameters and $T_0$ is a reference temperature that is set to 20° C. as a nominal temperature for convenience. Many different types of fit functions that can be used, and this example should not be taken to limit the validity of the approach with other fit functions such as sums and products of polynomial and rational functions in two variables as are known in the art.

A nonlinear fit on the data in Table III using the fit function of Equation (1) gives the parameters already shown in Table I. These fit parameter values together with the desired wavelength input and the measured AOTF cell temperature can be inserted into the equation to calculate the optimal frequency needed. This can be done for any temperature and wavelength of interest, not just where the measurements were made.

While the calculated frequencies are precise enough to achieve the desired performance on a prototype or manufacturing sample device on which the original data set was taken, a next device that is built and assembled may have slightly different properties (i.e., fabrication and alignment variables) and the parameter set associated with the prototype or manufacturing sample may not faithfully predict the RF frequency required for other devices of nominally the same configuration.

It is impractical to do a full characterization on each device that is built. In most cases, there is one particular type of variation that will dominate device-to-device performance variation. If the fit function is appropriately chosen, the performance of a misaligned AO cell will be well-described by the original fit-function, but with different fit coefficients. An example of such a misalignment is the deviation from the design working point of the angle defined by the laser beam propagation and the optical axis of the AO cell. This misalignment can be quantified in appropriate units such as degrees. It is not necessary to measure or know the value of the misalignment; it is sufficient to determine its effect on the fit function coefficients. Let the parameter M describe this deviation from an optimal design/alignment. For each value of M, there is a set of fit coefficients for a given functional form that describes the actual performance of the device with the given misalignment. These fit coefficients define functions P(M) where P stands for any of the fit parameters to describe variations caused by misalignment (note that "misalignment" may include any parameter such as, e.g., temperature, optical alignment, optical power, etc.).

$$f(\lambda, T, M) = \frac{A(M)}{\sqrt{\lambda^2 - B(M)^2}}(1 + (T - T_0) \times (C(M) + D(M)\lambda + E(M)\lambda^2)) \quad (5)$$

Depending on the sensitivity of the function P(M), the variation of P may be neglected without loss of accuracy in predicting f, or it may have to be represented by a linear or even a quadratic expansion. In the case where the misalignment is an angular rotation α of the device from the nominal design value, adjustments to only the two first parameters need to be considered:

$$f(\lambda, T, \alpha) = \frac{A + K\alpha}{\sqrt{\lambda^2 - (B + L\alpha)^2}}(1 + (T - T_0) \times (C + D\lambda + E\lambda^2)) \quad (6)$$

While the formula looks more complex than equation 4, having two additional coefficients, it will accurately predict the frequency needed for any misaligned device given the values of parameters K, L, and α. For this example, assuming a given setup where the angular misalignment is fixed (though unknown), it is necessary to perform measurements at two or more different wavelengths. Using equation 6 with the design specific parameters A through E and a nonlinear fit routine, these measurement results $f(\lambda, T)$ can be used to derive valued for Kα and Lα that minimize the error between the measurements and the prediction of equation 6.

The exemplary embodiments provided herein have treated temperature as one of the variables similar to the wavelength in the case of an AOTF (or deflection angle in the case of a deflector). All the concepts discussed herein can also be applied if it is assumed that the operating temperature of the AO device is a part of the nominal design. The prototype or manufacturing sample devices may then be characterized only at the design temperature. As a result, the function of equation (6) simplifies to contain none of the temperature dependent fit parameters. In this case, the dominant "misalignment" is the temperature deviation from the nominal design temperature. A second series of measurements at a different temperature will require slightly shifted A and B parameters, and this will determine the local derivatives of P(M). Once the device is built into a setup and operated at a fixed temperature, though different from the design temperature, measurements at two wavelengths will be sufficient to determine the corrections to the parameters A and B.

The examples given here for "misalignment", temperature deviation from the design temperature, temperature measurement error and angular rotation are not the only factors that can be compensated for using the procedure described above to determine the variation of the design specific parameter set.

It is possible, for example, to have variations in the stoichiometry of the AO crystal as well as alignment errors, and both need to be taken into consideration to achieve accurate results. In such a case, it is unlikely that both of those variations can be described with a single parameter M.

However, it always is possible, in principle, to expand the actual frequency dependence, including all the design deviations, in a Taylor series expansion around the nominal design value (Taylor series expansions are known in the art and, accordingly, are not described in detail). Partial derivatives with respect to the misalignments, times the magnitude of the misalignment, can be identified as the setup specific parameters. Even for a setup where the particular set of misalignments and their respective magnitudes are unknown, a Taylor expansion of the design specific parameters with respect to the misalignments is possible. For each of the fit parameters, the Taylor series is truncated after a small number of terms that is sufficient to accurately describe the misaligned systems to be considered. The actual form of the design specific function and how many additional parameters are required to reflect the range of setup variations depends on the particular class of setup. In one class of setups, for example, the temperature may be controlled for the AOTF, but the temperature sensor is not calibrated and thus not known absolutely. Each particular setup would then have an unknown temperature "misalignment." Assuming the device can be represented with the functional form shown in equation 4, the setup specific parameter that changes from one setup to the next is the value of $(T-T_0)$. One calibration measurement for a particular setup will be sufficient to determine this value.

EXEMPLARY EMBODIMENTS

Acousto-Optic Modulator

AO modulators are generally driven at a fixed RF frequency, addressing a fixed laser wavelength. In one embodiment, a method of the present invention allows the RF frequency to be adjusted by the frequency synthesizer as a function of one or more design specific, setup specific or environmental parameters.

Referring again to FIG. 5, in the case of laser 50 being a semiconductor laser, for example, the emitted wavelength of laser 50 is dependent on the operating temperature and/or the injection current of laser 50. As the laser diode ages, the required current generally increases to achieve a desired output power, typically leading to a wavelength drift with the aging of the diode. This wavelength change will require a frequency change for the driving signal. Similarly, the temperature at which the diode laser is operated influences the wavelength of emission, and the temperature at which the AO modulator is operated influences the wavelength at which the AO device is operated at optimal diffraction efficiency. One or several of those measured signals, the laser diode current, the laser diode temperature, and the AO device temperature, can be transmitted to the controller in either digital form or as analog an signal 41 or 42. Together with the application specific parameters stored in memory 12, these values are used as inputs to the control algorithm, stored in memory 12, to calculate the frequency where the modulator achieves optimal diffraction efficiency. The simplest algorithm for the case of a stable diode package temperature and AO device temperature depends on laser current in a linear fashion, as given by equation (7):

$$f(MHz) = f_0 + a \times I(mA) \quad (7)$$

The parameters $f_0$ and a are specific for the system configuration such as diode laser type and modulator type and they can be programmed together with the algorithm into the AO device specific memory 40 or the frequency synthesizer memory 12. No user interface 35 is necessary for this application. The method of compensating for diode operating condition variations will extend the operating time of the system before a diode laser replacement or maintenance intervention is necessary.

Adjustable Wavelength Laser

A broadband source can be used to build an adjustable wavelength laser using embodiments of the invention. The computer 35 may be employed as a user interface to prescribe performance parameters such as a certain wavelength at a given power level (e.g., 532 nm and 10 dBm of power). These performance parameters may be transmitted to the processor 20 over channel 36 as described above. A first algorithm is used to determine the optimal frequency to most efficiently diffract the desired wavelength. This algorithm's inputs include design and setup specific parameter sets. A second algorithm is determines the RF power required to achieve the desired wavelength output power. This second algorithm takes into account the spectral emission of the broadband source 50, the gain of the frequency generator 3, and the dependence of the AOTF efficiency on the wavelength. The AOTF efficiency, for example, increases for decreasing wavelength given a constant RF power. A function of the form $$P_{RF} = \exp(P_{dBm} + A + B\lambda + C\lambda^2 + D\lambda^3) \quad (8)$$

with adjustable parameters A,B,C, and D will likely be sufficient to account for all those wavelength dependencies and fairly closely predict the RF power setpoint of the RF generator given the desired wavelength output $P_{dBm}$. The outputs of the two algorithms are then fed to the DDS input of the RF generator 30 driving the AOTF device.

Adjusting for Angular Deviations in an AOTF Setup

A common misalignment affecting the RF frequency, needed for an AOTF to diffract a particular wavelength, is the angular tilting of an AO cell with respect to an incoming laser beam. The following function was used to fit experimental data spanning wavelengths from 457.9 nm to 632.8 nm and AO cell temperatures ranging from 16 to 73° C. Because large angular variations up to ±3° were considered, a quadratic approximation on the tilt angle was taken into account, yielding equation (9).

$$f(\lambda, T, \alpha) = \frac{A + K\alpha + M\alpha^2}{\sqrt{\lambda^2 - (B + L\alpha + N\alpha^2)^2}} (1 + (T - T_0) \times (C + D\lambda + E\lambda^2)) \quad (9)$$

Figure 8:
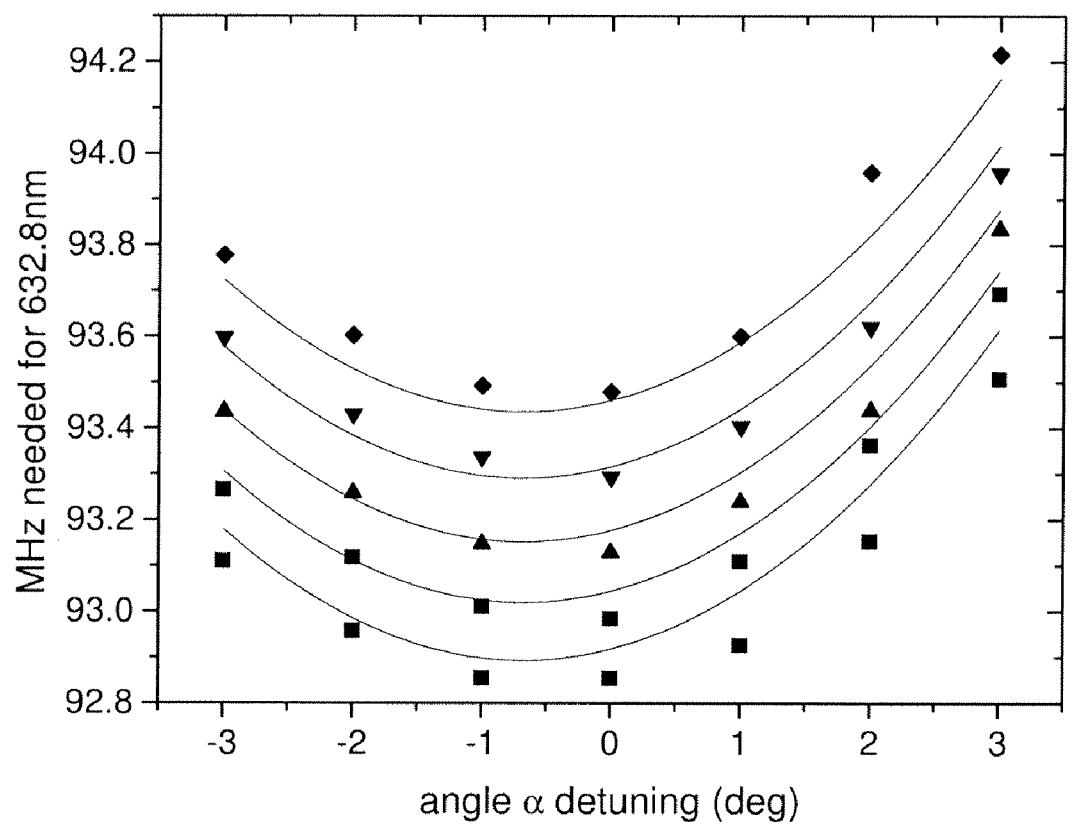
FIG. 8 illustrates the frequency dependence of an AOTF on rotation angle for various temperatures in one embodiment.

FIG. 8 illustrates the required frequency output of frequency synthesizer 3 as a function of the angular misalignment from the design condition, quantified by the tilt angle α, for different temperatures (shown as different symbols) for a fixed wavelength of 632.8 nm. Also shown are the curves calculated by the control algorithm using the function above, with parameters K=67.4; M=32.9; L=−0.059; N=−0.053. The agreement between experimental and predicted values is better than 200 kHz over the whole range with the fit curves, showing the correct trend as a function of angle.

Embodiments of the invention described above include various operations. The operations of the present invention may be embodied in computer-executable instructions, which may be used to cause a general-purpose or special-purpose processor programmed with the instructions to perform the operations. Alternatively, the operations may be performed by a combination of hardware and software.

The present invention may be provided as a computer program product, or software, that may include a computer-readable storage medium having stored thereon instructions, which may be used to program a computer system (or other electronic devices) to perform a process according to the present invention. A computer-readable storage medium includes any mechanism for storing or transmitting information in a form (e.g., software, processing application) readable by a computer. The computer-readable medium may include, but is not limited to: magnetic storage media (e.g., floppy diskette); optical storage media (e.g., CD-ROM); magneto-optical storage media; read only memory (ROM); random access memory (RAM); erasable programmable memory (e.g., EPROM and EEPROM); flash memory; or other type of medium suitable for storing electronic instructions.

The present invention may also be practiced in distributed computing environments where the computer-readable storage medium is stored on or executed by more than one computer system. In addition, the information transferred between computer systems may either be pulled or pushed across the communication medium connecting the computer systems.

Some portions of the foregoing description include algorithms and symbolic representations of operations on data that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A system, comprising:
    an acousto-optic device including an acoustic transducer and configured to store a plurality of design specific parameters for a parametric tuning algorithm;
    a frequency synthesizer coupled to the acousto-optic device, the frequency synthesizer configured to provide a radio frequency (RF) tuning signal to the acousto-optic device via the acoustic transducer;
    a programmable controller coupled to the acousto-optic device and the frequency synthesizer,
    wherein the programmable controller is configured to read the plurality of design specific parameters and to receive a second plurality of parameters comprising one or more of environmental parameters, setup specific parameters and user specified performance parameters, and
    wherein the programmable controller is further configured to apply the plurality of design specific parameters and the second plurality of parameters to the design specific parametric tuning algorithm to select a radio frequency tuning signal that optimizes a user specified performance parameter.

2. The system of claim 1, wherein the parametric tuning algorithm includes a functional form for a tuning function and incorporates parametric variables for the plurality of design specific parameters, the environmental parameters, the setup specific parameters and the user specified performance parameters.

3. The system of claim 1, wherein the user specified performance parameters include one or more of a diffracted wavelength, a deflection angle and a diffraction efficiency.

4. The system of claim 1, wherein the design specific parameters include parametric variable coefficients for one or more of an acousto-optic device temperature input, an RF signal frequency output, an RF signal power output, an optical input power and an optical alignment input.

5. The system of claim 1, wherein the setup specific parameters include one or more of optical alignment and an environmental parameter selected from at least one of temperature and optical input power.

6. The system of claim 1, wherein the acousto-optic device comprises one or more of an acousto-optic modulator, an acousto-optic tunable filter and an acousto-optic deflector.

7. The system of claim 1, wherein the acousto-optic device includes one or more acoustic transducers.

8. The system of claim 1, wherein either automatically or under user control, the programmable controller is further configured to generate a setup specific parametric tuning algorithm for the acousto-optic device when the design specific parametric tuning algorithm does not produce the user specified performance parameter.

9. The system of claim 8 wherein, to generate a setup specific parametric tuning algorithm, the programmable controller is configured to:
    measure one or more of the environmental parameters and the setup specific parameters;
    scan a range of RF tuning signals while measuring corresponding performance parameters; and
    modify coefficients of the design specific parametric tuning algorithm to match the measured performance parameters with the range of RF tuning signals.

* * * * *